United States Patent
Koning et al.

(10) Patent No.: US 6,828,413 B2
(45) Date of Patent: Dec. 7, 2004

(54) PROCESS FOR THE PREPARATION OF A POLYAMIDE

(75) Inventors: Cornelis E. Koning, Amstenrade (NL); Rudy Rulkens, Valkenburg aan de Geul (NL); Nicolaas F. Haasen, Limbricht (NL); Albert A. Van Geenen, Sittard (NL)

(73) Assignee: OSM IP Asseta, B.V., Heerlen (NL)

( * ) Notice: Subject to any disclaimer, the term of this patent is extended or adjusted under 35 U.S.C. 154(b) by 32 days.

(21) Appl. No.: 10/177,761

(22) Filed: Jun. 24, 2002

(65) Prior Publication Data

US 2003/0027977 A1 Feb. 6, 2003

Related U.S. Application Data

(63) Continuation of application No. PCT/NL00/00811, filed on Nov. 7, 2000.

(30) Foreign Application Priority Data

Dec. 23, 1999 (NL) .............................. 1013939

(51) Int. Cl.$^7$ ..................... C08G 69/08; C07D 201/08
(52) U.S. Cl. ....................... 528/310; 528/312; 528/322; 528/323; 528/328; 528/332; 528/335; 528/336; 525/419; 525/420; 525/422; 525/432; 540/538; 524/600; 524/602; 524/606; 524/608
(58) Field of Search ............................... 528/310, 312, 528/322–323, 328, 332, 335–336; 525/419–420, 422, 432; 524/600, 602, 606, 608; 540/538

(56) References Cited

U.S. PATENT DOCUMENTS

| | | | | |
|---|---|---|---|---|
| 4,730,040 A | * | 3/1988 | Vagt et al. | 540/538 |
| 4,730,041 A | * | 3/1988 | Hutmacher et al. | 540/538 |
| 4,731,445 A | * | 3/1988 | Hutmacher et al. | 540/538 |
| 4,766,237 A | * | 8/1988 | Hutmacher et al. | 560/155 |
| 5,877,314 A | * | 3/1999 | Herkes et al. | 540/538 |
| 5,965,689 A | * | 10/1999 | Koning et al. | 528/310 |
| 6,172,178 B1 | * | 1/2001 | Koning et al. | 528/310 |
| 6,362,307 B1 | * | 3/2002 | Mohrschladt et al. | 528/310 |
| 6,528,614 B2 | * | 3/2003 | Kloosterman et al. | 528/310 |
| 6,660,857 B2 | * | 12/2003 | Agterberg et al. | 540/531 |

FOREIGN PATENT DOCUMENTS

| | | | |
|---|---|---|---|
| EP | 0729 943 A2 | * | 9/1996 |
| EP | 0 968 185 B1 | * | 8/2001 |
| FR | 870162 | | 2/1941 |
| NL | 54783 | | 1/1943 |
| NL | 61734 | | 9/1948 |
| WO | 99/43734 | | 9/1999 |

* cited by examiner

Primary Examiner—P. Hampton Hightower
(74) Attorney, Agent, or Firm—Mayer, Brown, Rowe & Maw, LLP

(57) ABSTRACT

The invention relates to a process for the preparation of a polyamide comprising at least a step in which a composition that comprises at least (a) a primary aminocarbonamide and (b) an aminocarboxylic acid and/or a lactam is polymerised, said composition comprising at least
(a) 10–90 wt. % primary aminocarbonamide;
(b) 10–90 wt. % aminocarboxylic acid and/or lactam;
(c) 0–4 wt. % water;
the amounts being relative to the sum of the compounds (a+b+c). Preferably the sum of the compounds (a+b+c) is at least 75 wt. % of the total composition, more preferably 85 wt. %, most preferably 90 wt. %.

The polyamide obtained with the process has a $\eta_{rel}$ of more than 2.2.

The process is eminently suitable for the preparation of polyamide-6 (polycapronamide) from a composition comprising 6-aminocapronamide, 6-aminocaproic acid and/or ε-caprolactam. This composition is preferably obtained via the reductive amination of a 5-formylvalerate ester, preferably 5-formylmethylvalerate in water. The 5-formylvalerate ester can for example be obtained from butadiene via (a) a carbonylation and (b) a hydroformylation reaction.

20 Claims, No Drawings

PROCESS FOR THE PREPARATION OF A POLYAMIDE

This is a continuation of International Application No. PCT/NL00/0081 filed Nov. 7, 2000 which designated the U.S. and was published in English.

The invention relates to a process for the preparation of a polyamide comprising at least a step in which a composition that comprises at least (a) a primary aminocarbonamide and (b) an aminocarboxylic acid and/or a lactam is polymerised.

Such a process is for example known from WO-A-9943734, which describes the preparation of a polyamide-6 from a composition containing 6-aminocapronitrile, 6-aminocapronamide, 6-aminocaproic acid, ε-caprolactam and water, in the presence of a heterogeneous metal-oxide catalyst at elevated pressure and temperature.

The disadvantage of the process according to WO-A-9943734 is that no high relative viscosities can be obtained, in particular a polyamide-6 with a $\eta_{rel}$ of more than 2.2. In the context of this application, $\eta_{rel}$ is understood to be the relative viscosity measured in a 1 wt. % solution of formic acid. Another disadvantage of the process according to WO-A-9943734 is the presence of an amount of aminocapronitrile in the composition. A large amount of water, at least 50 wt. %, is required to hydrolyse and subsequently polymerise this compound. A large amount of water is disadvantageous with respect to obtaining a high $\eta_{rel}$ in a polymerisation based on a 1-step polycondensation process. Another disadvantage is that several steps (at least 3) are required to obtain the polyamide according to WO-A-9943734. Another disadvantage of the process according to WO-A-9943734 is the need to use a catalyst to obtain a polyamide-6 with a $\eta_{rel}$ of at least 1.6 and at most 2.2. A polyamide-6 with such a low $\eta_{rel}$ is of little economic interest; in particular, it is not suitable for the production of fibres, films and moulded parts. Another disadvantage of the process according to WO-A-9943734 is that the polymerisation has to be carried out at elevated pressure, for example at a pressure of $55 \cdot 10^5$ Pa.

The aim of the invention is a process for the preparation of a polyamide that does not show the disadvantages according to the state of the art. In particular the aim of the invention is to prepare a polyamide-6 with a $\eta_{rel}$ of more than 2.2.

The inventors have now surprisingly found that such a polyamide can be prepared if the composition comprises at least
(a) 10–90 wt. % primary aminocarbonamide;
(b) 10–90 wt. % aminocarboxylic acid and/or lactam;
(c) 0–4 wt. % water;
the amounts being relative to the sum of the compounds (a+b+c).

Preferably the sum of the compounds (a+b+c) is at least 75 wt. % of the total composition, more preferably at least 85 wt. %, and most preferably at least 90 wt. %.

Surprisingly, it was also found that even a small amount of aminonitriles had a major negative influence on the $\eta_{rel}$ of the polyamide prepared with the process according to the invention. Preferably the composition therefore contains less than 0.1 wt. % aminocarbonitriles, more preferably less than 0.05 wt. %, most preferably less than 0.01 wt. %, the amounts being relative to the total composition. Such an influence was not described in WO-A-9943734.

Preferably the composition according to the invention contains 20–80 wt. %, more preferably 30–70 wt. % of the primary aminocarbonamide.

Preferably the composition according to the invention contains 20–80 wt. %, more preferably 30–70 wt. %, of the aminocarboxylic acid and/or lactam.

Preferably the composition according to the invention contains less than 2 wt. %, more preferably less than 1 wt. % water.

The primary aminocarbonamide present in the composition which is polymerized in the process according to the invention is a compound according to formula (I)

where m=3 to 12, preferably m=4 to 7. A particularly suitable compound is 6-aminocapronamide (m=5).

The aminocarboxylic acid is a compound according to formula (II)

where m=3 to 12, preferably m=4 to 7. A particular suitable aminocarboxylic acid compound is 6-aminocaproic acid (m=5).

The lactam is a compound according to formula (III)

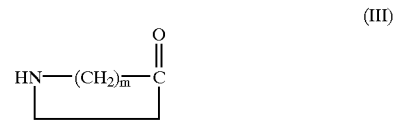

where m=3 to 12, preferably m=4 to 7. A particular suitable lactam compound is ε-caprolactam (m=5).

The composition according to the invention may optionally also contain aminocarboxylic esters, secondary or tertiary aminocarbonamides and oligomers of aminocarboxylic acid compounds. Examples of suitable aminocarboxylic esters are aminocarboxylic esters of which the ester group contains a $C_{1-14}$ alkyl group, for example a methyl, ethyl, n-propyl, i-propyl, n-butyl, sec-butyl and tert-butyl group. The aminocarboxylic ester is for example 6-aminocaproic methylester and 6-aminocaproic ethylester. The oligomer is for example the cyclic oligomer of ε-caprolactam. Preferably the composition contains at most 25 wt. %, relative to the total composition, more preferably at most 15 wt. %, most preferably at most 5 wt. %, of such compounds.

The process is eminently suitable for the preparation of polyamide-6 (polycapronamide) from a composition of 6-aminocapronamide, 6-aminocaproic acid and/or ε-caprolactam. Such a composition can be obtained by mixing the aforementioned individual compounds, which are commercially available. However, a particularly suitable embodiment of the invention is that in which the composition is obtained in the reductive amination of a 5-formylvalerate ester, for example 5-formylmethylvalerate, for example according to the following reaction:

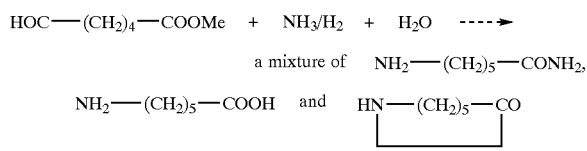

Examples of such a reaction are described in EP-A-729943, EP-A-729944, U.S. Pat. Nos. 4,766,237, 4,730,041, 4,731,445 and 5,068,398. Such a composition typically contains amounts of (a) 6-aminocapronamide and (b)

6-aminocaproic acid and/or ε-caprolactam in an a/b ratio= 3/1 to 1/3, in particular 2/1 to 1/2. Such ratios are eminently suitable for the execution of the process according to the invention. The mixture, directly obtained via the reductive amination, also contains an amount of water and an alcohol, for example methanol, which can however easily be removed in their entirety or in part, for example through evaporation or distillation. Such a composition (from which the water and the alcohol have been almost completely removed) can then be directly polymerised to obtain polyamide-6. The invention hence also relates to a process for the preparation of polyamide-6 in which the composition is obtained in the reductive amination of a 5-formylvalerate ester performed in the presence of water, preferably 5-formylmethylvalerate.

The 5-formylvalerate ester can for example be obtained from butadiene via (a) a carbonylation and (b) a hydroformylation, for example according to the following reactions:

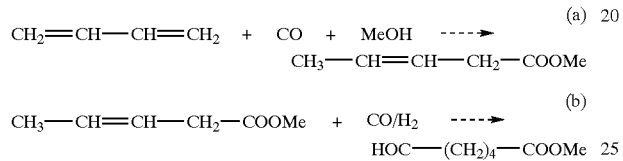

Examples of reaction step (a) are described in WO-9933779 and WO-9838151. Examples of reaction step (b) are described in WO-9518089 and WO-9733854. The invention hence also relates to a process for the preparation of polyamide-6 in which the composition is obtained from butadiene through successively (a) a carbonylation, (b) a hydroformylation and (c) a reductive amination of the mixtures of intermediates successively obtained.

The polyamide-6 prepared with the aid of the process according to the invention has a $\eta_{rel}$ of at least 2.2 and a low concentration of cyclic dimer of ε-caprolactam.

A particular advantage of the process according to the invention is that no catalyst need to be used, as a result of which the end product (the polyamide) contains no catalyst residues, or the preparation does not comprise a step in which a catalyst must be removed from or deactivated in the reaction mixture or polyamide. Another advantage is that the preparation can be carried out in polymerisation installations that are used on a large technical scale for the polymerisation of ε-caprolactam, for example as described in *Kunststoff Handbuch* 1, Becker/Braun, Hanser Verlag, 1990, in particular in installations in which the polymerisation is carried out in a VK column (VK=Vereinfacht Kontinuerlich). In this case the composition according to the invention is supplied to the top of a vertical tube reactor or a series of tube reactors at a temperature of about 240° C. to 275° C. and at a pressure of (0.5–100). $10^5$ Pa, preferably (0.5–20). $10^5$ Pa, more preferably (0.5–1.1). $10^5$ Pa. Under these conditions the polymerisation is in a first part of the column initiated by means of ring opening of the lactam (if present) under the influence of the water present, after which the polycondensation and polyaddition take place in the next part of the column, with water and ammonia being discharged. Residence times are in the order of 10–20 hours to realise a sufficiently high degree of polymerisation. During the polymerisation an equilibrium is established between the polymer, the monomers and oligomers, as a result of which the polyamide leaving the polymerisation column contains in the order of 10 wt. % monomers and 2 wt. % oligomers, in particular the cyclic oligomer of caprolactam. The total polymerisation time can be shortened by a few hours if use is also made of a prepolymerisation reactor ahead of the VK column, in which a low-molecular polyamide is prepared under comparable VK conditions.

The polyamide leaving the VK column can subsequently be after-condensed in the manner known to one skilled in the art to raise the relative viscosity to for example 4.0, as a result of which the polyamide becomes suitable for for example film applications.

The reaction mixture may also contain the usual chain length regulators and branching agents known to one skilled in the art, plus the usual additives such as titanium dioxide, nucleating agents, stabilisers, antioxidants, clay particles, glass fibres, nano-material and mixtures thereof.

Suitable for use as chain length regulators are monofunctional carboxylic acids, for example aliphatic and aromatic carboxylic acids, in particular propionic acid, acetic acid, benzoic acid and monofunctional amines, in particular cyclohexylamine, tridecylamine, benzylamine, triacetone diamine and mixtures thereof, difunctional carboxylic acids, for example aliphatic and aromatic dicarboxylic acids, in particular adipic acid, azelaic acid, sebacic acid, dodecanoic diacid, terephthalic acid, isophthalic acid and difunctional amines, in particular hexane diamine, xylylene diamine and aminodicyclohexylmethane.

Suitable for use as branching agents are compounds containing three functional groups that can react with the end groups of the polyamide, in particular N,N',N"-(tris-caproic acid) melamine and dendrimers based on polyamines, for example as described in DE-A-19654179.

The invention also relates to the polyamide that can be obtained with the process according to the invention. In addition to the acid and amine end groups, this polyamide also contains a number of amide end groups.

The invention also relates to the use of the polyamide for the production of fibres, injection or extruded moulded parts or films as well as to the fibres, injection or extruded moulded parts or films obtainable from the polyamide obtainable according to the invention process.

The invention will be further elucidated with reference to the following examples, without however being limited thereto.

EXAMPLES

Example I

Preparation of polyamide-6 (PA 6)

A cylindrical glass reaction vessel with a capacity of 150 ml and an internal diameter of about 4 cm, fitted with a heating jacket, a reflux cooler (with water with a temperature of 15–20° C. as coolant) and a magnetic Teflon stirrer, was filled with 8.10 g of ε-caprolactam (DSM, Heerlen, the Netherlands), 3.06 g of 6-aminocaproic acid (Aldrich, USA) and 8.84 g of 6-aminocapronamide (Syncom, Groningen, the Netherlands). The reactor vessel was purged with nitrogen and its contents was heated at a temperature of 265° C. for 12 hours at atmospheric pressure. These reaction conditions are almost identical to the reaction conditions under which PA 6 is prepared on an industrial scale starting from ε-caprolactam. The water and the ammonia that are released in the reaction were refluxed in the inert nitrogen atmosphere. The reaction product (the polyamide) was subsequently cooled to room temperature and crushed. The concentration of oligomer compounds, in particular the cyclic dimer of caprolactam (CD), was determined by means of HPLC before extraction; the concentration of carboxyl and amino end groups was determined after extraction with boiling water (3 times 2 hours) by means of titration; the relative viscosity $\eta_{rel}$ was measured in a 1 wt. % solution of formic acid after extraction of the water-extractable compounds with boiling water (3 times 2 hours). The results are summarised in Table 2. $T_m$ was determined with the aid of Differential Scanning Calorimetry (DSC) at a scanning speed of 10° C./min.

Examples II–IV and Comparative Example A

Example I was repeated using a number of other compositions and reaction conditions, summarised in Table 1.

The examples show that a polyamide is obtained that has a $\eta_{rel}$ of more than 2.2 and a concentration of cyclic dimer that does not differ significantly from [that of] a polymer obtained from ε-caprolactam alone (Comparative Example A). This polyamide can be after-condensed to the required degree of polymerisation in a subsequent step. The $\eta_{rel}$ obtained is high enough for direct use as a fibre, as an injection-moulded part, as an extruded moulded part or as a film.

TABLE 1

Composition of the reaction mixture.

| Example | ACAM | ACA | CAP | water | T/P/time |
|---|---|---|---|---|---|
| I | 8.842 (44%) | 3.06 (15%) | 8.1 (41%) | 0 | 265° C./0.1 MPa/12 hours |
| II | 8.842 (43%) | 3.06 (15%) | 8.1 (40%) | 0.407 (2%) | 265° C./0.1 MPa/12 hours |
| III | 8.842 (44%) | 3.06 (15%) | 8.1 (41%) | 0 | 265° C./0.1 MPa/12 hours + 265° C./0.01 MPa/4 hours |
| IV | 8.842 (43%) | 3.06 (15%) | 8.1 (40%) | 0.407 (2%) | 265° C./0.1 MPa/12 hours + 265° C./ 0.01 MPa/4 hours |
| A | 0 | 3.06 (25%) | 8.1 (68%) | 0.8 (7%) | 265° C./0.1 MPa/12 hours |

Quantities in grams and in wt. %.
ACAM: 6-aminocapronamide
ACA: 6-aminocaproic acid
CAP: ε-caprolactam

TABLE 2

Properties of the polyamide.

| Example | $\eta_{rel}$* | $[NH_2]^*$ (meq/kg) | $[CO_2H]^*$ (meq/kg) | [CAP] (wt. %) | [CD] (wt. %) | $T_m^{2**}$ (° C.) |
|---|---|---|---|---|---|---|
| I | 2.43 | 55 | 31 | 7.2 | 0.5 | 220 |
| II | 2.43 | 53 | 25 | 7.4 | 0.6 | 221 |
| III | 2.80 | 45 | 40 | 5.3 | 0.4 | 220 |
| IV | 3.35 | 36 | 15 | 5.4 | 0.5 | 220 |
| A | 2.62 | 49 | 40 | 8.0 | 0.5 | 221 |

*Determined after extraction and drying (in 90% formic acid)
**A Mettler Toledo Star System (DSC) was used to determine the melting temperature $T_m^2$ (peak value of the second heating curve). The measurement was carried out using a heating and cooling rate of 10 ° C./min. in an $N_2$ atmosphere. A polyamide sample was successively heated from 20° C. to 260° C., cooled to 20° C. and heated from 20° C. to 260° C.

What is claimed is:

1. Process for the preparation of a polyamide comprising at least a step in which a composition that comprises at least (a) a primary aminocarbonamide and (b) an aminocarboxylic acid and/or a lactam is polymerised, wherein the composition comprises:
   (a) 10–90 wt. % primary aminocarbonamide;
   (b) 10–90 wt. % aminocarboxylic acid and/or lactam
   (c) 0–4 wt. % water;
   the amounts being relative to the sum of the compounds (a+b+c).
2. Process according to claim 1, wherein the composition comprises
   (a) 20–80 wt. % primary aminocarbonamide;
   (b) 20–80 wt. % aminocarboxylic acid and/or lactam
   (c) 0–2 wt. % water;
   the amounts being relative to the sum of the compounds (a+b+c).
3. Process according to claim 1, wherein the composition comprises
   (a) 30–70 wt. % primary aminocarbonamide;
   (b) 30–70 wt. % aminocarboxylic acid and/or lactam
   (c) 0–1 wt. % water;
   the amounts being relative to the sum of the compounds (a+b+c).
4. Process according to claim 1, wherein the sum of the compounds (a+b+c) is at least 75 wt. % of the total composition.
5. Process according to claim 1, wherein the sum of the compounds (a+b+c) is at least 85 wt. % of the total composition.
6. Process for the preparation of polyamide-6 according to claim 1, wherein the primary aminocarbonamide is 6-aminocapronamide, the aminocaproic acid is 6-aminocaproic acid and the lactam is ε-caprolactam.
7. Process for the preparation of polyamide-6 according to claim 6, wherein the composition is obtained in a reductive amination of a 5-formylvalerate ester performed in the presence of water.
8. Process according to claim 7, wherein the 5-formylvalerate ester is 5-formylmethylvalerate.
9. Process for the preparation of polyamide-6 according to claim 6, wherein the composition is obtained from butadiene through, successively, (a) a carbonylation, (b) a hydroformylation and (c) a reductive amination of the mixtures of intermediates successively obtained.
10. Process for the preparation of polyamide-6 according to claim 6, wherein the ratio of (a) 6-aminocapronamide and (b) 6-aminocaproic acid and/or ε-caprolactam (a/b) is 3/1–1/3.
11. Process according to claim 1, wherein the composition contains less than 0.1 wt. % aminonitriles.
12. Process according to claim 1, wherein the polymerisation is carried out in a VK column at a temperature of about 240° C. to 275° C. and at a pressure of about $(0.5–100)10^5$ Pa.
13. Polyamide obtainable with the process according to claim 1.
14. Fibres, injection or extruded moulded parts or films comprising a polyamide according to claim 13.
15. Process comprising forming the polyamide according to claim 13 into a fiber.
16. Process comprising injection moulding or extrusion moulding the polyamide according to claim 13 to form a moulded part.

17. Process comprising forming the polyamide according to claim 13 into a film.

18. Process according to claim 1, which is carried out in the absence of a catalyst.

19. Process for the preparation of a polyamide comprising polymerizing a composition comprising:

(a) 10–90 wt. % primary aminocarbonamide;

(b) 10–90 wt. % aminocarboxylic acid and/or lactam (c) 0–4 wt. % water;

the amounts being relative to the sum of the compounds (a+b+c), and wherein the resulting polyamide has a relative viscosity, $\eta_{rel}$, of at least 2.2.

20. Process according to claim 19, which is carried out in the absence of a catalyst.

* * * * *

UNITED STATES PATENT AND TRADEMARK OFFICE
CERTIFICATE OF CORRECTION

PATENT NO. : 6,828,413 B2
DATED : December 7, 2004
INVENTOR(S) : Koning et al.

It is certified that error appears in the above-identified patent and that said Letters Patent is hereby corrected as shown below:

Title page,
Item [73], Assignee change "OSM" to -- DSM -- and change "Asseta" to -- Assets --

Signed and Sealed this

Twelfth Day of July, 2005

JON W. DUDAS
*Director of the United States Patent and Trademark Office*